Patented Feb. 17, 1948

2,436,205

UNITED STATES PATENT OFFICE 2,436,205

RESISTANCE WELDING ELECTRODE

Le Roy Deitz and Ivar W. Johnson, Schenectady, N. Y., assignors to General Electric Company, a corporation of New York No Drawing. Application December 20, 1946, Serial No. 717,592

5 Claims. (Cl. 219—4)

Our invention relates to electrodes and more particularly to electrodes for electric welding by the resistance welding process.

In resistance welding, the parts to be joined are welded by simultaneously applying pressure and electric heating current to localized areas thereof through the agency of pressure exerting, current conducting electrodes. The flow of current produces a resistance heating of the parts to a welding temperature at the pressure applied by the electrodes and the parts are united by the weld formed by the combined heating and pressure effects.

The size of the work engaging surfaces of the electrodes is of great importance since it determines not only the welding pressure applied to the work parts but also the density of heating current flow through these work parts both of which are critical factors in the formation of a desired resistance weld. If the work engaging surfaces of the electrodes become overheated during the welding operation, they become deformed and enlarged as they are repeatedly used in forming welds and the initially set pressure and current characteristics, which depend on the initial size of these work engaging surfaces, are so changed that unsatisfactory welding conditions occur and defective welds are consequently produced.

Various cooling arrangements may be resorted to in order to prevent this heating and deformation of the tips of the electrodes. Thus the electrodes may be cooled by applying a cooling fluid thereto internally or externally of the electrode. Sometimes because of the size of the electrodes, the nature of the work parts, or the operating conditions imposed, it is not possible to resort to such cooling operations. Furthermore, it is often possible to employ electrodes, which by reason of their composition relative to the work being welded can be used without artificial cooling for making a large number of welds before their work engaging surfaces become deformed sufficiently seriously to detract from their utility.

Difficulty is often experienced in resistance welding due to the sticking of an electrode to the work. This is really another manifestation of overheating of the tip of the electrode. If the electrode during a welding operation sticks to the work, this interferes seriously with the welding operation by spoiling not only the work surface but also by damaging the working surface of the electrode so that surface heating thereof is aggravated and satisfactory welding cannot again be established until the working tip of the electrode is refinished or a new electrode substituted.

The resistance welding of carbonized nickel used in electrode assemblies of electronic tubes is not satisfactorily accomplished by using electrodes of known composition. It has been found that a copper electrode can be used only for a limited time when welding carbonized nickel because of the fact that it overheats, mushrooms and sticks to the work, thus requiring frequent replacement. Furthermore, other types of electrodes which have heretofore been used for difficult welding operations are likewise unsatisfactory for welding carbonized nickel. Examples of such other types of electrodes are the Elkonite electrode of U. S. Letters Patent 1,539,810, Robert T. Gillette, May 26, 1925, or the Trodoloy electrode of U. S. Letters Patent 1,957,214, Edward H. Horstkotte, May 1, 1934. Such other electrodes, when used for welding carbonized nickel, also stick to the work and deform at their work engaging surfaces after forming a limited number of welds so that they are no longer suited for applying the desired welding current and pressure which has been adjusted in accordance with their initial work engaging surface before deformation.

Carbonized nickel is essentially nickel having a coating of carbon thereon. It is extensively used in electronic tubes as grid shields, shield-grids, anodes, and shielding elements adjacent or between electrodes. It may be fabricated by heating a nickel part, such as a sheet, in a hydrocarbon atmosphere so that carbon is deposited from the hydrocarbon onto the nickel as an adherent film. It is not necessary for an understanding of my invention to consider in detail the various steps of the processes used in manufacturing carbonized nickel.

It is an object of our invention to provide a resistance welding electrode that is particularly suited for resistance welding carbonized nickel.

The nature and scope of our invention will become apparent from the following description taken in connection with the appended claims.

We have found that a resistance welding electrode formed of or having a tip of copper containing carbon distributed therethrough and forming about .25 to .75 per cent by weight of the tip material is particularly suited for welding parts of carbonized nickel. Such electrodes have from 100 to 200 times the operating life of electrodes formed of copper, Elkonite, Trodoloy and the like, which we have found to be poorly suited for welding carbonized nickel.

Resistance welding electrodes in accordance with our invention may be formed entirely of copper containing carbon distributed therethrough in the percentage above noted, or only the operating tip thereof may be formed of this material which is suitably attached to the body portion of the electrode by brazing, welding, or through the agency of some mechanical connection.

The resistance welding electrode material of our invention is preferably formed by mixing the proper proportions of copper and carbon powders and then forming the mixture by the well-known hot or cold press methods of powder metallurgy in order to consolidate it into a pressure resisting composite material capable of operation without deformation under the pressure and temperature conditions encountered in the resistance welding process in which it is to be used. In accordance with a preferred procedure, powdered copper and artificial graphite are mixed for 4 to 6 hours in a ball mill, pressed in a standard steel mold at about 59,000 pounds per square inch and then fired in a hydrogen atmosphere to about 950° C. The copper powder is preferably of a fineness such that all will pass through a 200 mesh screen and about 85 per cent thereof will pass through a 300 mesh screen. Alternatively, the electrode material may be made from such copper powder which has been fired for 2 or 3 hours at 450° to 500° C. in hydrogen to reduce the copper oxide which might have formed, then mixed with artificial graphite in a ball mill for 10 to 12 hours, and the mixture thus obtained then pressed in a graphite mold at about 2,500 pounds per square inch and at a temperature of approximately 1,000° C. When so fabricated, the material is preferably cooled under pressure.

These and other procedures may be employed to produce the pressure exerting, current carrying compact embodying our invention and consisting of an intimate mixture of copper and graphite powders in which the graphite is about .25 to .75 per cent by weight of the mixture. Our experience indicates that the preferred percentage ratio by weight of copper to graphite is about 99.5 to .5.

The electrode material may be fabricated in the desired forms by the processes above described, or the material may be made by these or similar processes in block form from which the electrode or electrode tips are formed by suitable machining operations.

It is, of course, apparent that other metallurgical procedures may be employed for fabricating an electrode or an electrode tip having the composition above specified.

What we claim as new and desire to secure by Letters Patent of the United States is:

1. A pressure exerting, current carrying compact consisting of an intimate mixture of copper and carbon powders in which the percentage by weight of carbon present is about .25 to .75 per cent of the mixture.

2. A resistance welding electrode having a working tip of copper containing carbon distributed therethrough and forming about .25 to .75 per cent by weight of the tip material.

3. A current conducting, pressure exerting electrode having a working tip consisting of porous copper impregnated with graphite, the percentage ratio by weight of copper to graphite being about 99.5 to .5.

4. A pressure exerting, current carrying electrode for electric welding by the resistance process, said electrode having a working tip consisting of an intimate mixture of copper and graphite powders in which the graphite content is from .25 to .75 per cent by weight of the mixture, said mixture being consolidated to form a pressure resisting composite material capable of operation without deformation under the pressure and temperature conditions encountered in said welding process.

5. A pressure exerting, current carrying electrode for electric welding by the resistance process, said electrode having a working tip consisting of an intimate mixture of copper and graphite powders in which the graphite content is about .5 per cent by weight of the mixture and in which the copper powder has a particle size that will pass through a 200 mesh sieve and 85 per cent of which will pass through a 300 mesh sieve, said mixture being consolidated to form a pressure resisting composite material capable of operation without deformation under the pressure and temperature conditions encountered in said welding process.

LE ROY DEITZ.
IVAR W. JOHNSON.

REFERENCES CITED

The following references are of record in the file of this patent:

UNITED STATES PATENTS

| Number | Name | Date |
|---|---|---|
| 1,067,003 | Deats et al. | July 8, 1931 |
| 1,802,718 | Jennings | Apr. 28, 1931 |
| 2,319,240 | Larsen et al. | May 18, 1943 |